United States Patent [19]

Ocieczek et al.

[11] Patent Number: 5,787,138
[45] Date of Patent: Jul. 28, 1998

[54] SUPERVISION OF A NEUTRON DETECTOR IN A NUCLEAR REACTOR

[75] Inventors: Grzegorz Ocieczek, Vasteras, Sweden; Mika Tiusanen, Tampere, Finland

[73] Assignee: ABB Atom AB, Vasteras, Sweden

[21] Appl. No.: 750,004

[22] PCT Filed: Jun. 2, 1995

[86] PCT No.: PCT/SE95/00634
§ 371 Date: Feb. 27, 1997
§ 102(e) Date: Feb. 27, 1997

[87] PCT Pub. No.: WO95/34077
PCT Pub. Date: Dec. 14, 1995

[30] Foreign Application Priority Data

Jun. 2, 1994 [SE] Sweden ............... 9401901

[51] Int. Cl.$^6$ ............................................. G21C 17/108
[52] U.S. Cl. ................... 376/254; 376/215; 395/24; 395/915
[58] Field of Search ................... 376/215, 216, 376/217, 254; 395/21–24, 907, 915; 364/148, 224.9, 275.2, 551.01, 924.4, 972.4

[56] References Cited

U.S. PATENT DOCUMENTS

| | | | |
|---|---|---|---|
| 5,023,045 | 6/1991 | Watanabe et al. | 376/216 |
| 5,311,562 | 5/1994 | Palusamy et al. | 376/215 |
| 5,349,541 | 9/1994 | Alexandro, Jr. et al. | 395/23 |
| 5,581,459 | 12/1996 | Enbutsu et al. | 395/22 |
| 5,623,579 | 4/1997 | Damiano et al. | 395/22 |

OTHER PUBLICATIONS

The Electrical Engineering Handbook, pp. 420–429, editor Richard C. Dorf, 1993, CRC Press.

*Primary Examiner*—Daniel D. Wasil
*Attorney, Agent, or Firm*—Pollock, Vande Sande & Priddy

[57] ABSTRACT

A method of monitoring neutron flex detectors in a nuclear reactor in a neural network is provided. The network comprises an input layer which receives a number of input signals corresponding to values of a measured signal at different times and an output layer which is adapted to deliver a number of state signals. The network is taught to identify a number of different trends of the measured signal such that the state signals indicate the trends, by supplying the network with a plurality of input signals which have known state signals. The network is then supplied with input signals which correspond to values of a measured signal taken at different times from a supervised detector. Also, input signals corresponding to values of measured signals taken at different times from a reference detector are supplied to the network. Next, state signals for the supervised detector and for the reference detectors are calculated and whether the supervised detector is defective is determined based on the state signals.

5 Claims, 7 Drawing Sheets

| ERROR NR | N1$_u$ | N2$_u$ | N3$_u$ | N4$_u$ | R1 | R2 | R3 | R4 |
|---|---|---|---|---|---|---|---|---|
| 1 | <0.1 | <0.1 | <0.1 | <0.1 | >0.4 | x | x | x |
| 1 | <0.1 | <0.1 | <0.1 | <0.1 | x | >0.4 | x | x |
| 1 | <0.1 | <0.1 | <0.1 | <0.1 | x | x | >0.4 | x |
| 1 | <0.1 | <0.1 | <0.1 | <0.1 | x | x | x | >0.4 |
| 2 | >0,4 | x | x | x | <0.1 | x | x | x |
| 3 | x | >0,4 | x | x | x | <0.1 | x | x |
| 4 | x | x | >0,4 | x | x | x | <0.1 | x |
| 5 | x | x | x | >0,4 | x | x | x | <0.1 |
| 6 | x | >0.2 | >0,4 | x | x | <0.1 | <0.1 | x |
| 6 | >0,4 | x | x | >0,2 | <0.1 | x | x | <0.1 |
| 6 | >0,2 | x | >0,4 | x | <0.1 | x | <0.1 | x |
| 7 | x | >0,4 | x | >0,1 | x | <0.1 | x | <0.1 |

Fig. 9

SUPERVISION OF A NEUTRON DETECTOR IN A NUCLEAR REACTOR

TECHNICAL FIELD

The present invention relates to a method for supervision of a neutron flux detector in the reactor core of a nuclear reactor comprising a plurality of neutron flux detectors.

BACKGROUND OF THE INVENTION

A core in a nuclear reactor comprises a plurality of fuel assemblies. These are arranged vertically in the core in spaced relationship to each other. A fuel assembly comprises a plurality of vertical fuel rods, each of which contains a stack of circular-cylindrical pellets of a nuclear fuel, arranged in a cladding tube. The core is immersed into water which serves both as coolant and as neutron moderator. The reactor core also comprises a plurality of control rods which, by being inserted into and withdrawn from the core, control the reactivity of the core and hence its output power.

A boiling-water nuclear reactor (BWR) comprises a large number of neutron-sensitive detectors, so-called LPRM (Linear Power Range Monitor) detectors. The core comprises, regularly spaced from each other, a plurality of detector tubes, each one comprising four LPRM detectors placed at four different levels in the vertical direction. The detectors, which form a regular lattice in the core, measure the neutron flux which is directly proportional to the power. The output signals from the detectors are used as a basis for supervising the core and calculating the margins of the reactor and are connected to different safety functions. It is, therefore, important that any faults in the detectors be discovered and that the faulty detector be identified as soon as possible.

The LPRM detectors comprise a fissile material for detection of the neutron flux. When the detector is subjected to neutron irradiation, the fissile material is consumed, which means that the detector deflection is changed with time. The reduction of fissile material in the detectors is different for different detectors and depends on the amount of radiation to which the detector has been exposed. To compensate for this, the detectors are calibrated at regular intervals, approximately once every month. For this purpose, a movable neutron-sensitive detector, a so-called TIP detector (Traveling Incore Probe) is used, which is inserted through all the detector tubes in the core. The TIP detector measures the neutron flux at the same locations in the tube at which the LPRM detectors are placed. These TIP measured values are used as reference values and all the LPRM detectors are adjusted so as to coincide with the TIP measured values.

The LPRM measurements contain a high degree of noise. In addition, the detectors operate under extremely difficult conditions where the risk of faults arising in the detectors is relatively high. The LPRM detectors are filled with gas, for example argon. A frequently occurring fault is that a crack in the detector causes the gas slowly to leak out, which in turn causes the detector to drift. This type of fault is difficult to discover and requires that the output signals from the detector be studied for a long period of time.

The method currently used for supervising the LPRM detectors compares the output signals from the detectors with calculated values from a core simulator. This method has many uncertainties since the calculated values may be subjected to both model faults and faults in the input signals to the calculations. If the output signal from a detector differs from the calculated value, it may be difficult to determine whether there is a fault in the detector or a fault in the calculated value.

The LPRM detector may also be supervised by studying the output signal from the detector for a long period to see whether the detector is drifting or is otherwise defective. This method is not completely reliable either since it does not take into consideration whether the operating conditions have been changed during the period studied.

SUMMARY OF THE INVENTION

The invention aims to provide a method for supervision of a neutron detector in a reactor core, which method on the one hand indicates that the detector is defective and on the other hand gives an indication as to the type of fault occurring. The method is suitable for continuous supervision of the detector.

DETAILED DESCRIPTION OF THE PREFERRED EMBODIMENTS

Figure 1:
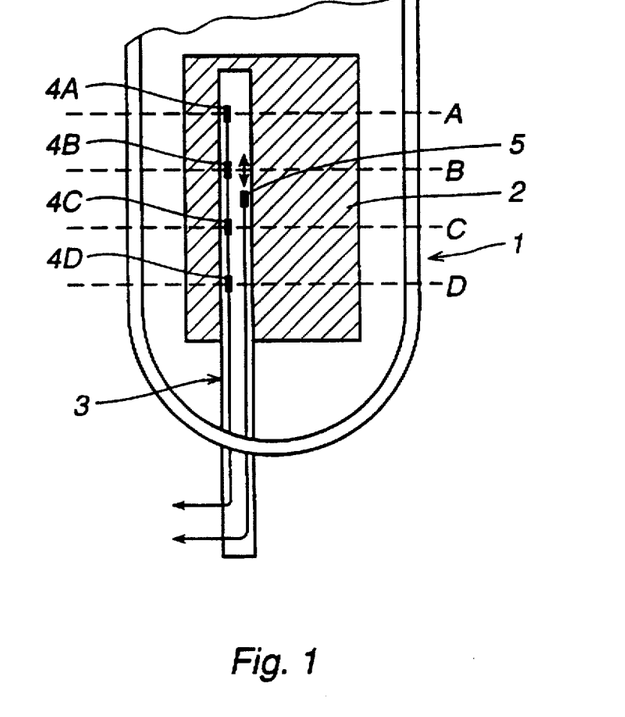
FIG. 1 is a schematic view of a reactor core with a detector tube in a cross section.
Figure 2:
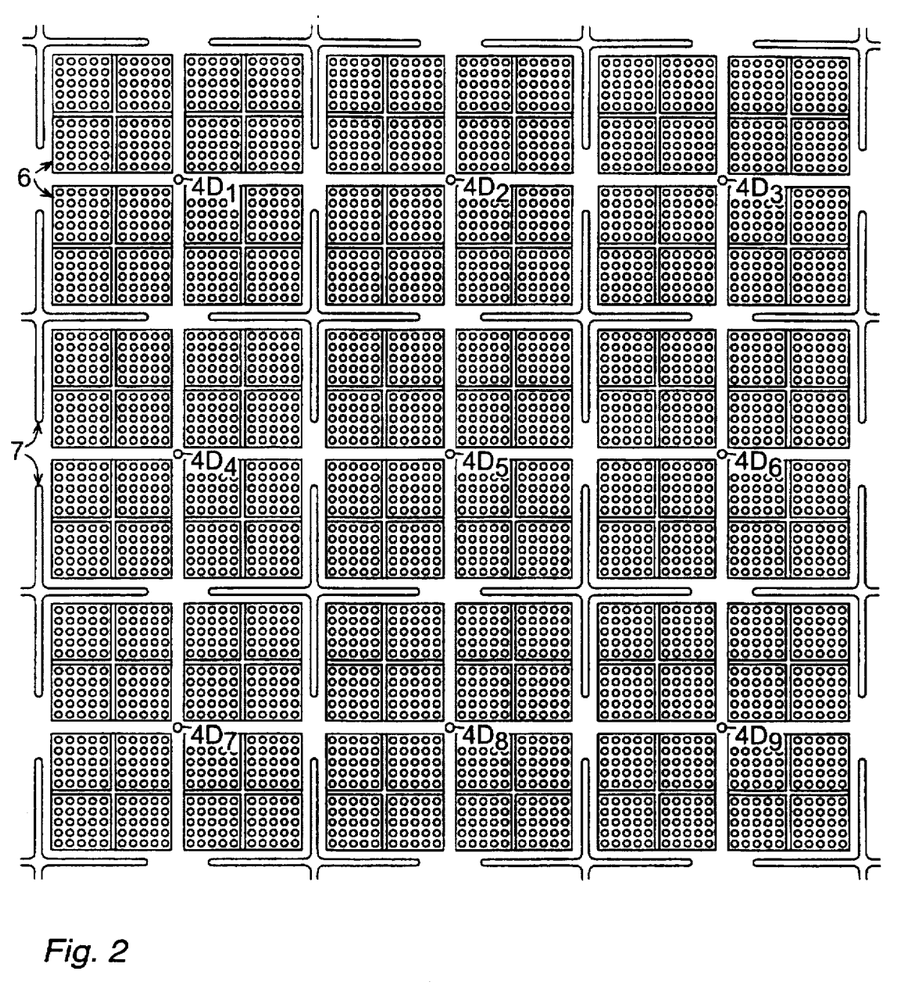
FIG. 2 shows part of the core in FIG. 1 in a horizontal section through level D.
Figure 3:
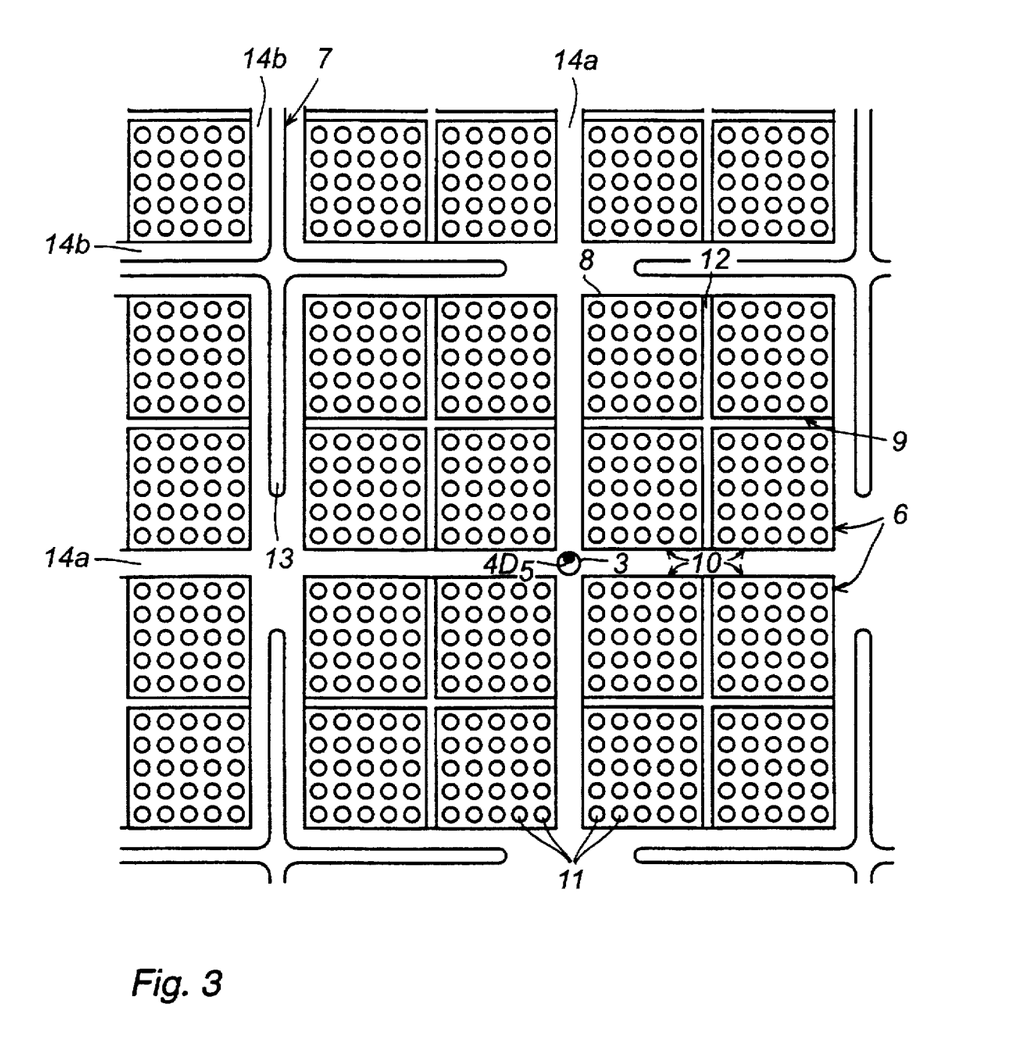
FIG. 3 shows an enlarged view of part of the reactor core in FIG. 2.

FIGS. 1, 2 and 3 show an example of a reactor core with neutron detectors to which the invention is applicable.

FIG. 1 shows a reactor vessel 1, associated with a boiling-water reactor, in cross section. The reactor core 2 contains fuel in the form of fuel assemblies between and through which cooling water is pumped. A plurality of vertical neutron detector tubes are arranged evenly distributed over the core. The figure shows a cross section of a neutron detector tube 3. The neutron detector tube includes four equidistantly distributed, fixedly mounted neutron flux detectors 4A, 4B, 4C, 4D, so-called LPRM detectors. All the LPRM detectors in the core are distributed at four levels, 80%, 60%, 40% and 20% of the height of the core. The levels are designated A, B, C, D in FIG. 1. The core comprises about 80–150 LPRM detectors, depending on the reactor type. The LPRM detectors form a rectangular lattice in the core. A movable neutron flux detector 5, a so-called TIP detector, may be run up and down in the neutron detector tube.

FIG. 2 shows part of the core in FIG. 1 in a horizontal section through level D. Fuel assemblies 6 with a substantially square cross section are arranged vertically in the core at a certain distance from each other. This forms a check pattern of vertically extending gaps between the fuel assemblies. The section includes 36 fuel assemblies. The total number of fuel assemblies in a whole cross section amounts to several hundred. The reactor core comprises a plurality of control rods 7, placed parallel to the fuel assemblies in the vertically extending gaps. In the vertically extending gaps, LPRM detectors $4D_1-4D_9$ are arranged. The control rods in the core are divided into control rod groups. When the control rods are to be moved, this is done in groups. An individual detector is normally never moved alone, but only together with the other control rods included in the same control rod group.

FIG. 3 shows an enlarged view of part of the reactor core in FIG. 2. The fuel assemblies 6 are enclosed in fuel channels 8, which are provided with a hollow support member 9 of cruciform cross section. The fuel channel with the support member is divided into four vertical channel-formed parts 10, so-called sub-assemblies, with at least substantially square cross section. Each sub-assembly contains a plurality of fuel rods 11. The rods are arranged in a lattice in which each rod is included in two rows perpendicular to each other. The rods are kept in their positions by so-called spacers (not shown), placed between top tie and bottom tie plates (also not shown) on the fuel assembly. The spaces between the fuel rods 11 within each sub-assembly 10 are traversed by water as is the cruciform channel 12 formed by the support member 9. The gaps between the fuel assemblies are also traversed by water.

The control rods 7 have a cruciform cross section with four blades 13 which are perpendicular to each other and which extend from a central part. The gaps into which the control rods can be inserted, the so-called control rod gaps 14b, are in this embodiment wider than the gaps where no control rods can be inserted, the so-called narrow gaps 14a. Centered between four control rods, that is, at the intersectional point between two narrow gaps 14a, a neutron detector tube 3 is arranged. The neutron detector tube comprises an LPRM detector $4D_5$.

The output signal from a defective detector may occur in different ways depending on the fault of the detector. If the detector does not react at all, the output signal remains constant at the same level no matter what happens around it. If the detector drives upwards or downwards, it behaves as normal, but its output signal is somewhat higher/lower than earlier. For different reasons, a detector may suddenly break and then exhibits a jump upwards or downwards in the output signal. FIGS. 7a-7e show five different trends of the output signal which may indicate that the detector is defective.

Figure 7A:
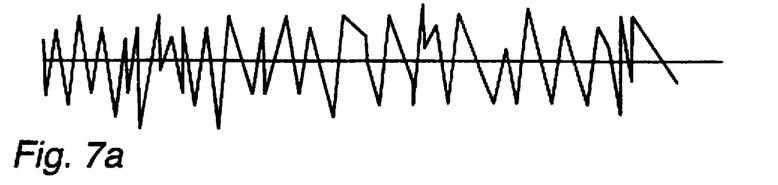
FIGS. 7a–7e show different trends of the output signal from an LPRM detector.
Figure 7B:
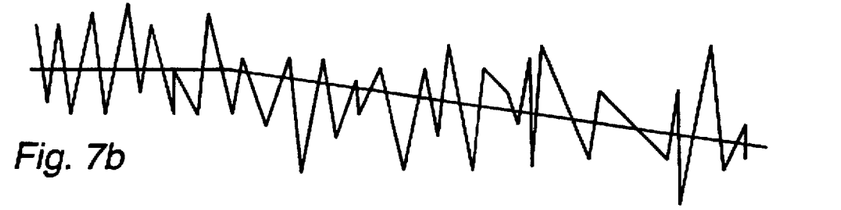
Figure 7C:
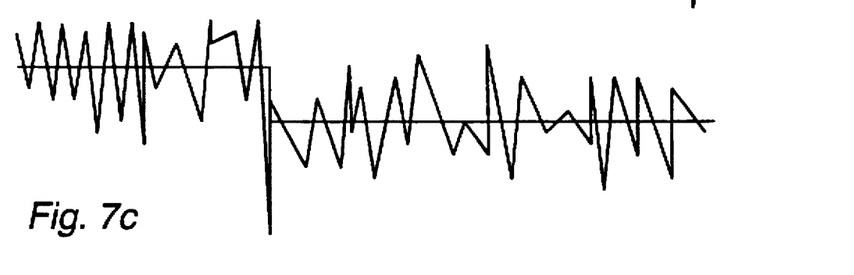
Figure 7D:
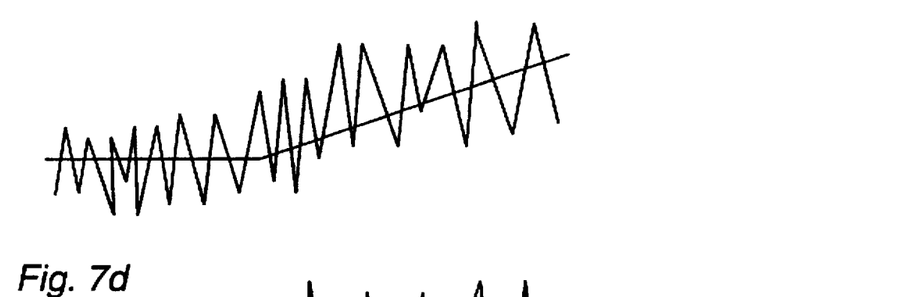
Figure 7E:
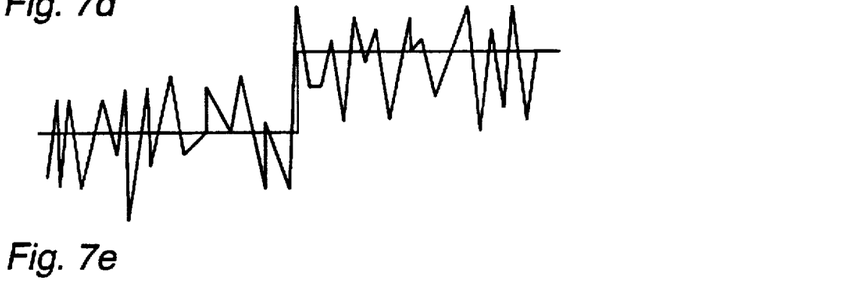

FIG. 7a shows an example of a constant output signal. The output signal consists only of noise on an otherwise constant signal. FIG. 7b shows an example of a weakly decreasing signal. FIG. 7c shows an example of a suddenly decreasing signal. FIG. 7d shows an example of a weakly increasing signal. FIG. 7e shows an example of a suddenly increasing signal.

The output signal from a detector often consists of a great deal of noise and it may, therefore, be difficult to discover faults, such as a drifting or a non-reacting detector. To identify certain patterns in the output signal which may indicate a fault in the detector, a neural network is used according to the invention.

Figure 4:
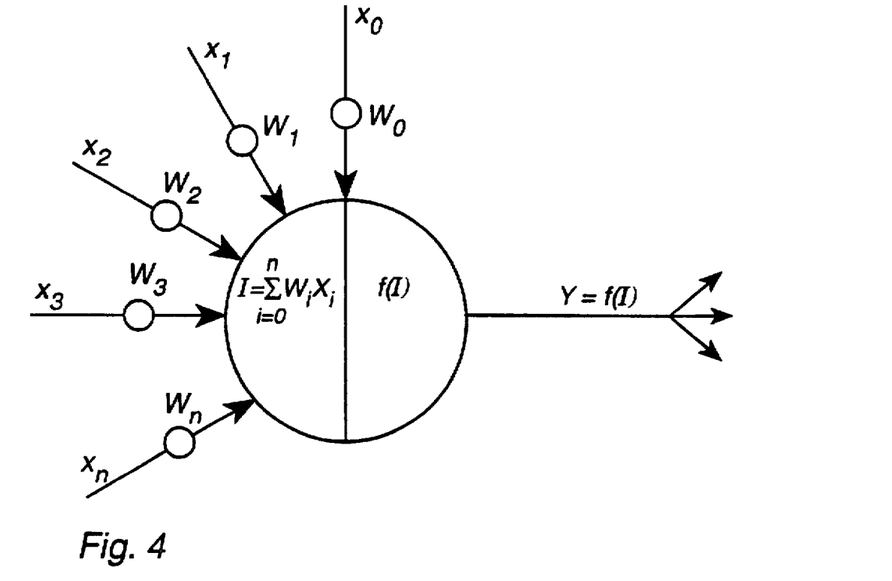
FIG. 4 shows an example of a process element.

A neural network comprises a number of process elements distributed at different levels and connected to one another through one-way connections. A process element has a plurality of inputs but only one output. FIG. 4 shows an example of a process element where $x_0-x_n$ constitute input signals. The input signals are multiplied by a connection weight $W_0-W_n$, specific for each input signal, and are summed.

$$I = \sum_{i=0}^{n} W_i x_i$$

Figure 5:
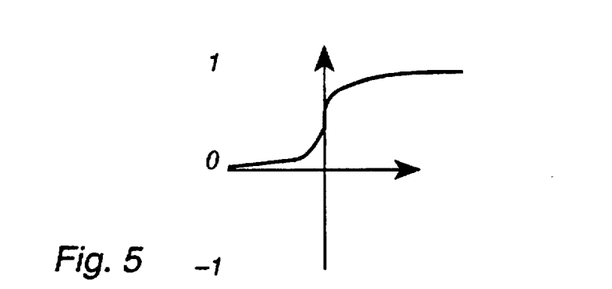
FIG. 5 shows a sigmoid function.

The output signal from the process element consists of the sum, $Y=f(I)$, transformed via a transfer function. FIG. 5 shows a sigmoid function which is an often used transfer function. The output signal from the process element may, in turn, constitute the input signal to a plurality of other process elements at a higher level.

Figure 6:
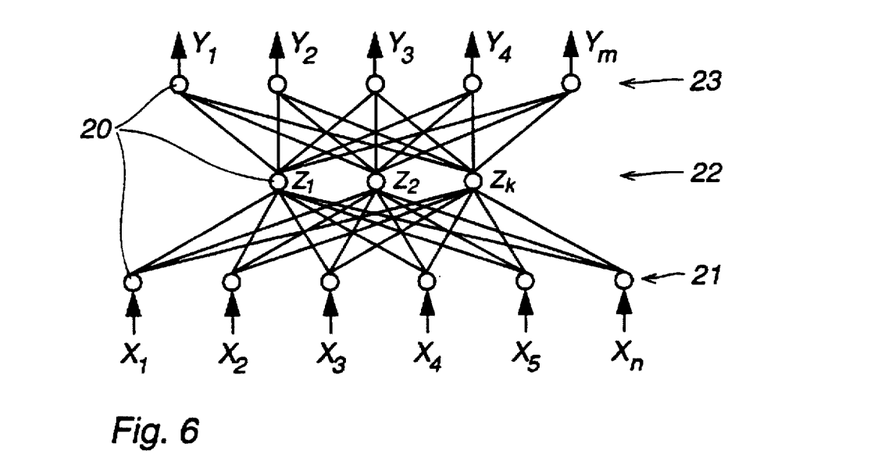
FIG. 6 shows an example of a neural network with three levels.

FIG. 6 shows an example of how a large number of process elements 20 may be organized in different layers so as to form a neural network. The number of layers and the number of process elements in each layer depend on the intended application. The network in FIG. 6 consists of three layers. An input layer 21, having n process elements, functions as a buffer for the input signals $x_1-x_n$. A hidden layer 22 consists of k process elements. An output layer 23 contains m process elements which buffer the output signals $Y_1-Y_m$. How the network behaves for different input signals is determined by the connection weights $W_x$ and these are determined in a learning phase.

Before the network can be used, it has to undergo a learning phase to learn how to respond to different input signals. For that purpose, a plurality of sets of input signals with associated known output signals and a back-propagation algorithm are required. Each set of input signals is sent through the network and the output signals obtained are compared with the known output signals, and based on the comparison a total error is calculated. The total error is minimized by modifying the connection weights. The back-propagation algorithm distributes the total error among all the process elements in the network by sending the error backwards through the network while at the same time the connection weights $W_x$ are adjusted. The input signals are sent through the network again and the total error between the new output signals and the known output signals is calculated. If the total error exceeds a minimum allowed error, the error is sent backwards while at the same time the connection weights are adjusted again. This process is repeated until the total error is less than the minimum allowed error. By being repeatedly trained with different sets of input signals with associated known output signals in this way, the network learns how to behave.

Neural networks are known per se and more about their function is described in *The Electrical Engineering Handbook*, pages 420-429, editor Richard C. Dorf, 1993, by CRC Press. For using neural networks there are ready-to-use computer programs, which are provided freely. In the following embodiments, there is used an ANN back-propagation algorithm program called ASPRIN V 5.0 published by MITRE Corporation, U.S.A.

The invention is based on the fact that a neural network is taught to identify a number of different trends on the basis of a plurality of input signals. In the following a preferred embodiment is described in which the neural network identifies the following five different trends: constant, weakly decreasing, suddenly decreasing, weakly increasing, and suddenly increasing.

The input signals to the neural network consist of a time window. An LPRM detector is read at regular intervals, in this example every tenth second. A suitable time window consists of the last 50 readings from the detector. The measured values from the last 50 readings are saved and constitute input signals to the neural network which calculates new trends every tenth second.

Figure 8:
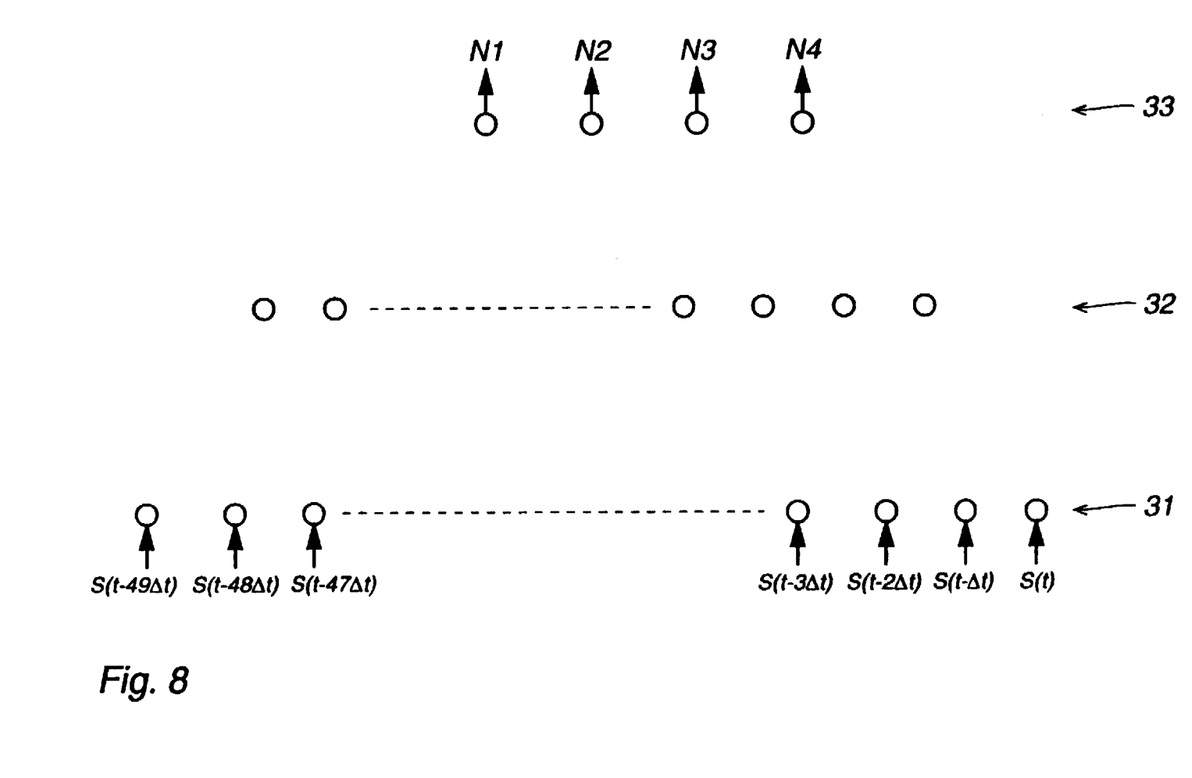
FIG. 8 shows a neural network for identifying trends in the output signal from an LPRM detector according to one embodiment of the invention.

FIG. 8 shows an example of a neural network for identifying the above-mentioned trends in the output signal from an LPRM detector. Such a neural network is hereinafter referred to as a trend network. The input layer 31 consists of 50 process elements which are supplied with input signals S(t)–S(t-49Δt) corresponding to the measured values from the last 50 readings of the detector. Δt is the time between two readings and in this example Δ=10s. The hidden layer 32 contains 25 process elements. The number may, of course, be both greater and smaller than 25. A greater number of process elements in the hidden layer gives greater accuracy while at the same time the calculations take longer. A smaller number of process elements gives faster calculations and less accuracy. The output layer 33 consists of four process elements, the output signals of which are hereinafter referred to as state signals N1–N4, of which N1 indicates a weakly decreasing trend
N2 indicates a suddenly decreasing trend
N3 indicates a weakly increasing trend
N4 indicates a suddenly increasing trend.

If none of the state signals indicates any trend, this means that the trend is constant. The transfer function consists of a sigmoid function with a definition range [0.1].

During a learning phase, the network learns to identify the five different trends. For teaching the trend network, data can be used either as proper data from a nuclear power plant under operation, or as data calculated during simulations. In this example, only simulated data are used. Sets of simulated input signals are stored in a data file and then constitute input data to a back-propagation algorithm program, for example ASPRIN V 5.0. At the beginning of the learning period, the input signals to the network are pure, that is, free of noise, and with a clear inclination. Gradually during the learning, the noise level is increased and the inclination reduced. A suitable number of sets of input signals may be between 2000 and 3000. The state signal is set at 0.9 when it indicates a trend, and at 0.0 when it does not indicate a trend.

To supervise the LPRM detector, the trend network is supplied with measured signals from the detector, and based on the connection weights determined during the learning phase, four state signals, $N1_s$, $N2_s$, $N3_s$, $N4_s$, are calculated for the supervised detector. During operation, the output signal of the detector rises and falls because of quite normal phenomena, for example a power increase or a power decrease. The output signal of the detector largely depends on the movements of the control rods. To be able to determine on the basis of the state signals of the detector whether the detector is defective, the state signals must be compared with state signals from other detectors in the core. In case of a power increase, a power decrease or control rod movements, a single detector is never influenced alone but a plurality of detectors exhibit the same tendencies.

Four reference detectors are selected for each supervised detector. The reference detectors should be chosen such that they behave in the same way as the investigated detector with regard to the movements of the control rods. In this embodiment, the reference detectors are chosen such that they are located at the same level in the core as the investigated detector. Two of the reference detectors are chosen such that they are located in the immediate vicinity of the investigated detector. The other two reference detectors are chosen such that they are located further away in the core, and in a position which is symmetrical in relation to a control rod which is included in the same control rod group as the investigated detector.

During the supervision, the trend network is supplied with measured signals from the reference detectors, and based on the connection weights determined during the learning phase, four state signals are calculated for each one of the reference detectors, $N1_{ri}$, $N2_{ri}$, $N3_{ri}$, $N4_{ri}$, i=1 ... 4. To be able to determine whether the supervised detector is defective, its state signals must be compared with the state signals of the reference detectors. To facilitate the comparison, four reference values R1, R2, R3, R4 are calculated, which constitute the mean value of the corresponding state signals for the reference detectors.

$$R1 = \frac{\sum_{i=1}^{4} N1_{ri}}{4} \quad R2 = \frac{\sum_{i=1}^{4} N2_{ri}}{4} \quad R3 = \frac{\sum_{i=1}^{4} N3_{ri}}{4} \quad R4 = \frac{\sum_{i=1}^{4} N4_{ri}}{4}$$

ri = reference detector No. i.

Figure 9:
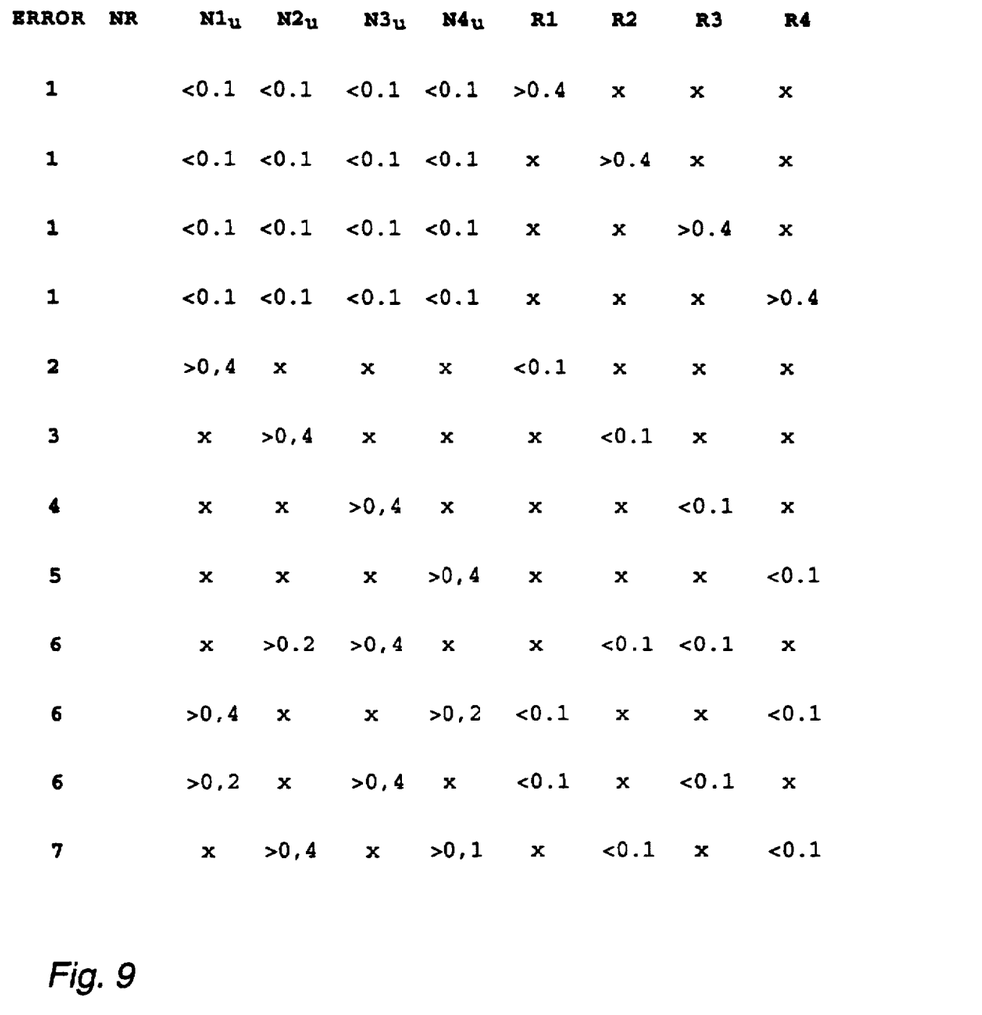
FIG. 9 shows a table of how different types of fault can be determined based on the state signals of the supervised detector and a number of reference values.

The state signals for the supervised detector are compared with the reference values. Based on the comparison, conclusions may be drawn as to whether the detector is defective and which type of fault has occurred in the detector. A number of types of fault, which may be read from the comparisons, are listed below. FIG. 9 shows how different types of fault may be determined based on the state signals of the detector and the reference values. If the magnitude of a reference value or a state signal is of no importance for the interpretation of a certain type of fault, it has been marked with an x in the table.

Error No. 1: The detector does not respond. All four state signals for the supervised detector are smaller than 0.1, and at least one of the reference values is greater than 0.4. This means that the supervised detector does not move in spite of the fact that the reference detectors are moving.

Error No. 2: The detector drives downwards. $N1_s$ is greater than 0.4 and R1 is smaller than 0.1. The supervised detector exhibits a decreasing trend not exhibited by the reference detectors.

Error No. 3: The detector makes a jump downwards. $N2_s$ is greater than 0.4 and R2 is smaller than 0.1. The supervised detector exhibits a suddenly decreasing trend not exhibited by the reference detectors.

Error No. 4: The detector drives upwards. $N3_s$ is greater than 0.4, and R3 is smaller than 0.1. The supervised detector exhibits an increasing trend not exhibited by the reference detectors.

Error No. 5: The detector makes a jump upwards. $N4_s$ is greater than 0.4 and R4 is smaller than 0.1. The supervised detector exhibits a suddenly increasing trend not exhibited by the reference detectors.

Error No. 6: The detector oscillates. Within one and the same time window, the output signal both rises and falls in spite of the fact that the reference signal is substantially constant.

Error No. 7: Fast oscillations or an abnormally high noise level give this type of error.

In the examples above, four reference detectors have been selected but, of course, the number may be both greater and smaller than four and their location in the core may be chosen in some other way.

With the method described above, a selected number of, or all the detectors in the core, may be supervised. A supervised detector may, while at the same time being supervised, constitute a reference detector for one or more other supervised detectors.

We claim:

1. A method of monitoring neutron flux detectors in a nuclear reactor with a neural network, said network comprising an input layer adapted to receive a number of input signals corresponding to values at different times of a measured signal; and an output layer adapted to deliver a number of state signals, said method comprising the steps of:

supplying said network with a plurality of input signals with known state signals to teach said network to identify a number of different trends of said measured signal such that said state signals indicate said trends;

supplying said network with input signals corresponding to values at different times of a measured signal from a supervised detector;

supplying said network with input signals corresponding to values at different times of measured signals from a number of reference detectors;

calculating state signals for said supervised detector and for said reference detectors; and determining whether said supervised detector is defective based on said state signals.

2. A method according to claim 1 further comprising the step of calculating a number of reference values based of the state signals of the reference detectors.

3. A method according to claim 2 further comprising the step of determining whether said detector is defective based on said reference values and said state signals.

4. A method according to claim 2 further comprising the step of calculating said reference values as a mean value of said state signals which correspond to each said reference detector.

5. A method according to claim 1 further comprising the step of determining a type of error that has occurred based on said state signals.

* * * * *